United States Patent
Lee et al.

(10) Patent No.: US 8,135,837 B2
(45) Date of Patent: Mar. 13, 2012

(54) UPNP QOS NETWORK SYSTEM AND METHOD FOR RESERVING PATH AND RESOURCE

(75) Inventors: Kwang-Il Lee, Daejeon (KR);
Dong-Hwan Park, Daegu (KR);
Jun-Hee Park, Daejeon (KR);
Kyeong-Deok Moon, Daejeon (KR);
Chae-Kyu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 560 days.

(21) Appl. No.: 11/951,902

(22) Filed: Dec. 6, 2007

(65) Prior Publication Data

US 2008/0140842 A1 Jun. 12, 2008

(30) Foreign Application Priority Data

Dec. 8, 2006 (KR) .................. 10-2006-0124801

(51) Int. Cl.
*G06F 15/173* (2006.01)
(52) U.S. Cl. ........ 709/226; 709/223; 709/225; 709/227; 370/229; 370/230; 370/242
(58) Field of Classification Search .......... 709/223–227; 370/254–468
See application file for complete search history.

(56) References Cited

U.S. PATENT DOCUMENTS

| | | | |
|---|---|---|---|
| 6,590,867 B1 | 7/2003 | Ash et al. | |
| 6,597,684 B1 | 7/2003 | Gulati et al. | |
| 7,693,161 B2 * | 4/2010 | Sung ............................. | 370/401 |
| 7,859,998 B2 * | 12/2010 | Wade et al. ................... | 370/230 |
| 7,872,970 B2 * | 1/2011 | Lee et al. ...................... | 370/230 |
| 2003/0005130 A1 * | 1/2003 | Cheng .......................... | 709/228 |
| 2004/0228304 A1 * | 11/2004 | Riedel et al. .................. | 370/332 |
| 2004/0257985 A1 * | 12/2004 | Sahai et al. .................... | 370/229 |
| 2005/0058066 A1 * | 3/2005 | Sung ............................. | 370/229 |
| 2005/0114496 A1 * | 5/2005 | Fang et al. .................... | 709/224 |
| 2005/0198693 A1 * | 9/2005 | Choi et al. ...................... | 726/26 |
| 2006/0149845 A1 * | 7/2006 | Malin et al. .................. | 709/228 |
| 2006/0168320 A1 * | 7/2006 | Kidd et al. .................... | 709/238 |
| 2007/0124439 A1 * | 5/2007 | Shah et al. .................... | 709/223 |
| 2007/0195715 A1 * | 8/2007 | Yamano et al. ............... | 370/254 |
| 2007/0211631 A1 * | 9/2007 | Rahman et al. ............... | 370/230 |
| 2007/0248116 A1 * | 10/2007 | Hamada ........................ | 370/468 |
| 2007/0286074 A1 * | 12/2007 | Xu ................................ | 370/230 |
| 2009/0070411 A1 * | 3/2009 | Chang et al. .................. | 709/203 |
| 2009/0138596 A1 * | 5/2009 | Song ............................. | 709/225 |
| 2009/0231999 A1 * | 9/2009 | Verma et al. .................. | 370/235 |

FOREIGN PATENT DOCUMENTS

KR    1020010016690 A    3/2001

* cited by examiner

*Primary Examiner* — Wing Chan
*Assistant Examiner* — Razu Miah

(57) ABSTRACT

A universal plug and play quality of service (UPnP QoS) network system and a method of reserving a path and resource thereof are provided. In order to set a path from a source device to a target device and to clearly control reservation of network resources for setting the path, the UPnP QoS network system includes: one or more UPnP QoS execution devices collecting and providing network status information and performing QoS for a service requested by reserving network resources based on path information and resource reservation information; and one or more UPnP QoS management devices acquiring and providing the path information and the resource reservation information to the UPnP QoS execution device by considering a QoS rank for the requested service and the network status information provided by the UPnP QoS execution device. Accordingly, since the path calculated by the UPnP QoS management device is the same as the path through which the UPnP QoS execution device reserves the network resources, it is possible to reserve suitable network resources and to provide stable QoS.

14 Claims, 3 Drawing Sheets

UPNP QOS NETWORK SYSTEM AND METHOD FOR RESERVING PATH AND RESOURCE

CROSS-REFERENCE TO RELATED APPLICATIONS

This application claims the priority of Korean Patent Application No. 10-2006-0124801 filed on Dec. 8, 2006, in the Korean Intellectual Property Office, the disclosure of which is incorporated herein by reference.

BACKGROUND OF THE INVENTION

1. Field of the Invention

The present invention relates to a universal plug and play (UPnP) network system, and more particularly, to UPnP quality of service (QoS) for setting a path from a source device to a target device and explicitly controlling reservation of network resources in a home network that supports UPnP QoS and a method of reserving a path and resources thereof.

This work was supported by the IT R&D program of MIC/IITA[2004-S-605, Development of HD Level Interactive Multimedia Service Technology over Wireless Home Network].

2. Description of the Related Art

A UPnP technique allows communication without a complicate setting procedure among information home appliances connected to a network. In the UPnP techniques, it is possible for a device to automatically search for a service supported by another device.

In order to support QoS, a network system using the UPnP technique includes a UPnP QoS management device and one or more UPnP QoS execution devices. At this time, the UPnP QoS management device and each of the UPnP QoS execution devices is embodied as an internal system of a switch device or bridge device, or an independent device.

When a predetermined communication terminal requests the UPnP QoS management device to provide a service through a control point, the UPnP QoS management device obtains network status information on neighboring nodes connected to devices through the UPnP QoS execution devices.

The UPnP QoS management device calculates an optimal path from a predetermined communication terminal to a target communication terminal by using the obtained network status information. Then, the UPnP QoS management device requests all the UPnP QoS execution devices to provide the service and the QoS for the service by transmitting traffic feature information to all the UPnP QoS execution devices located on the calculated path.

Then, the UPnP QoS execution devices located on the calculated path selects and reserves network resources by referring to a media access control (MAC) address table managed by a bridge.

However, as described above, in a conventional network system, since the UPnP QoS execution device reserves the network resources according to the MAC address table managed by each bridge, a case where a path calculated by the UPnP QoS management device is different from a path through which the UPnP QoS execution device reserves resources may occur.

That is, a conventional UPnP QoS management device provides information for reserving resources to the UPnP QoS execution devices located on the calculated path. However, the conventional UPnP QoS management device does not provide information on which network resource is reserved for a device connected to two or more networks.

For example, as shown in FIG. 1, it is assumed that the UPnP network system includes a third communication terminal 33 connected to second and third UPnP QoS execution devices 22 and 23 and that the first UPnP QoS execution device 21 includes a MAC address table in which an address of the second UPnP QoS execution device 22 is stored as bridging information for the third communication terminal 33.

Then, the number of paths between the first and third communication terminals 31 and 33 is two. That is, there are a path including the first and second UPnP QoS execution devices 21 and 22 and a path including the first and third UPnP QoS execution devices 21 and 23.

A QoS management device 10 obtains a path including first and second UPnP QoS execution devices 21 and 22 as a path between the first and third communication terminals 31 and 33. Although the QoS management device 10 requests the first and third UPnP QoS execution devices 21 and 23 to provide the QoS, the first UPnP QoS execution device 21 unconditionally reserves network resources connected to the second UPnP QoS execution device 22.

Data of the first communication terminal 31 is transmitted to the second UPnP QoS execution device 23 through the first UPnP QoS execution device 21. However, since the second UPnP QoS execution device 22 does not reserve a network, it is impossible to satisfy the QoS for the requested service.

It is impossible to stably provide the QoS by using a method of reserving the network resources through the UPnP QoS execution device according to local information, that is, the MAC address table managed by the bridge, since the path through which the network resources are reserved is different from the calculated path.

Accordingly, in order to stably provide and secure the QoS for each service, it is necessary for the UPnP QoS execution device to reserve network resources along the path calculated by the QoS management device.

SUMMARY OF THE INVENTION

The present invention provides a universal plug and play quality of service (UPnP QoS) network system and a method of reserving a path and resources thereof capable of stably providing QoS with respect to a requested service by matching a calculated path with a path through which network resources are reserved.

According to an aspect of the present invention, there is provided a UPnP QoS network system comprising: one or more UPnP QoS execution devices collecting and providing network status information and performing QoS for a service requested by reserving network resources based on path information and resource reservation information; and one or more UPnP QoS management devices acquiring and providing the path information and the resource reservation information to the UPnP QoS execution device by considering a QoS rank for the requested service and the network status information provided by the UPnP QoS execution device.

According to another aspect of the present invention, there is provided a method of reserving a path and resources of UPnP QoS network system constructed with a UPnP QoS management device and one or more UPnP QoS execution devices, the method comprising: collecting network status information of each UPnP QoS execution device by using the UPnP QoS management device, when service is requested to be provided; acquiring path information and resource reservation information by using the UPnP QoS management device by considering the network status information and a QoS rank of the service; and selecting an interface based on the path information and reserving network resources of the selected interface based on the resource reservation information by using each UPnP QoS execution device.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
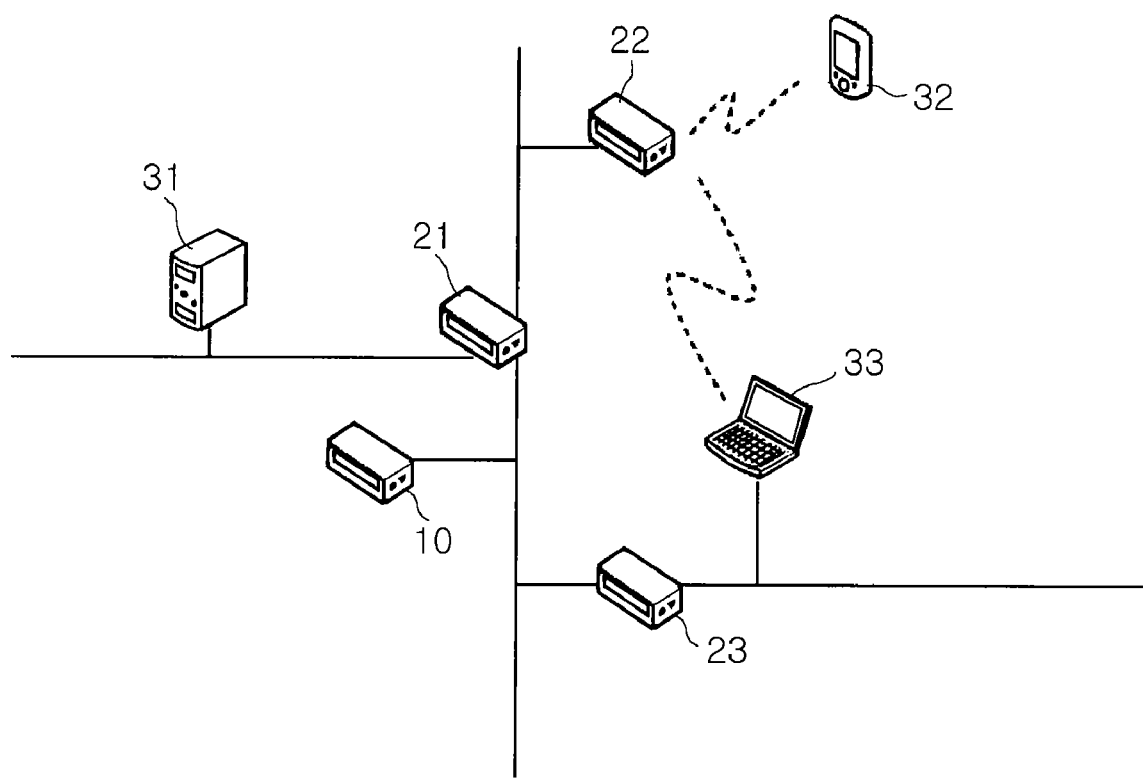
FIG. 1 illustrates an example of a configuration of a general UPnP QoS network system.

Exemplary embodiments of the present invention will now be described in detail with reference to the accompanying drawings. When it is determined that the detailed descriptions of the known techniques or structures related to the present invention depart from the scope of the invention, the detailed descriptions will be omitted.

In addition, like reference numerals in the drawings denote like elements.

Figure 2:
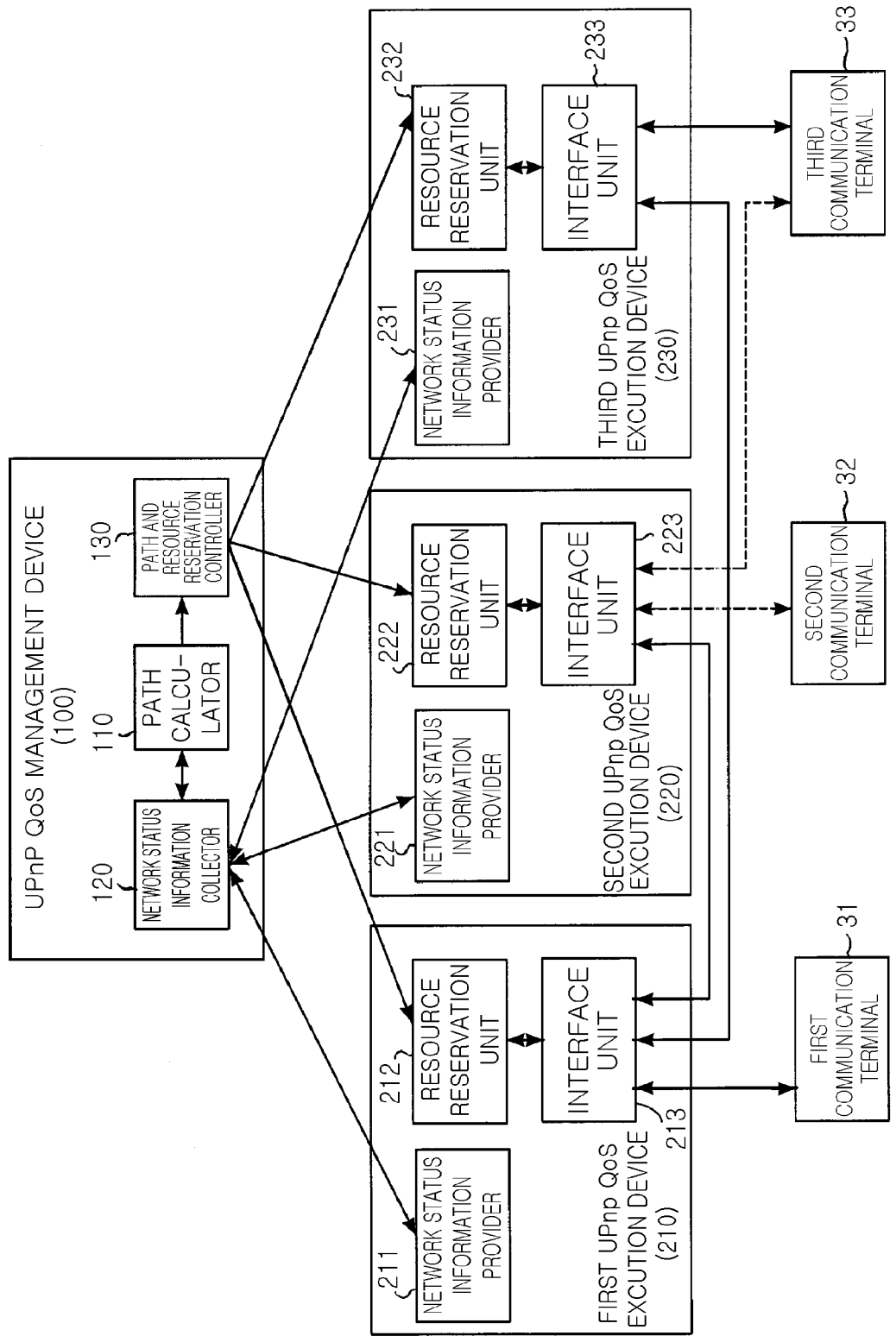
FIG. 2 is a block diagram illustrating a UPnP QoS network system according to an embodiment of the present invention.

FIG. 2 is a block diagram illustrating a UPNP QoS network system according to an embodiment of the present invention.

Referring to FIG. 2, the UPnP QoS network system according to the embodiment is constructed with a UPnP QoS management device 100, a plurality of UPnP QoS execution devices 210, 220, and 230, and a plurality of communication terminals 31 to 33. The UPnP QoS management device 100 includes a network status information collector 120, a path calculator 110, and a path and resource reservation controller 130. The UPnP QoS execution devices 210, 220, and 230 include network status information providers 211, 221, and 231, resource reservation units 212, 222 and 232, and interface units 213, 223, and 233, respectively. Then, as shown in FIG. 1, each UPnP QoS execution device 210 is connected to other UPnP QoS execution devices 220 and 230 or communication terminals 31, 32, and 33.

When a predetermined communication terminal requests the UPnP QOS management device 100 to provide a service, the UPnP QOS management device 100 requests the UPnP QOS execution devices 210, 220, and 230 to provide network status information and collects network status information that is transmitted in response to the request. At this time, the network status information includes interface connection status between the UPnP QoS execution device 220 and the neighboring devices 210, 32, and 33, information for reporting a traffic amount of each interface, and the like.

The path calculator 120 obtains a path calculation policy and a traffic policy by checking a QoS rank of a currently requested service. Then, the path calculator 120 calculates an optimal path from a predetermined communication terminal to the target communication terminal by considering the obtained path calculation policy and the traffic policy together with the network status information collected through the network status information collector 110.

The path and resource reservation controller 130 generates resource reservation information on the currently requested service by recognizing the traffic policy through the path calculator 120. Then, the path and resource reservation controller 130 allows the UPnP QoS execution devices 210 and 220 to reserve the network resources along the path that is the same as the calculated path by providing path information and resource reservation information to all the UPnP QoS execution devices 210 and 220 located on the calculated path.

At this time, the path information is one of address information of all the UPnP QoS execution devices located on the calculated path, address information of neighboring devices of the UPnP QoS execution device, and identification information of an interface device of the UPnP QoS execution device. The resource reservation information includes connection information of a service and traffic feature information.

The network status information provider 211 of each UPnP QoS execution device 210 acquires and transmits the network status information of itself to the network status information collector 120, in response to a request of the network status information collector 120.

The resource reservation unit 212 receives the path of the UPnP QoS management device 100, and path information and resource reservation information transmitted from the resource reservation controller 130. The resource reservation unit 212 selects one of interfaces of the interface unit 213 and reserves network resources of the selected interface based on the resource reservation information.

The interface unit 213 reserves the network resources under a control of the resource reservation unit 212. The interface unit 213 transmits and receives data based on the service that is requested through the network resources.

Figure 3:
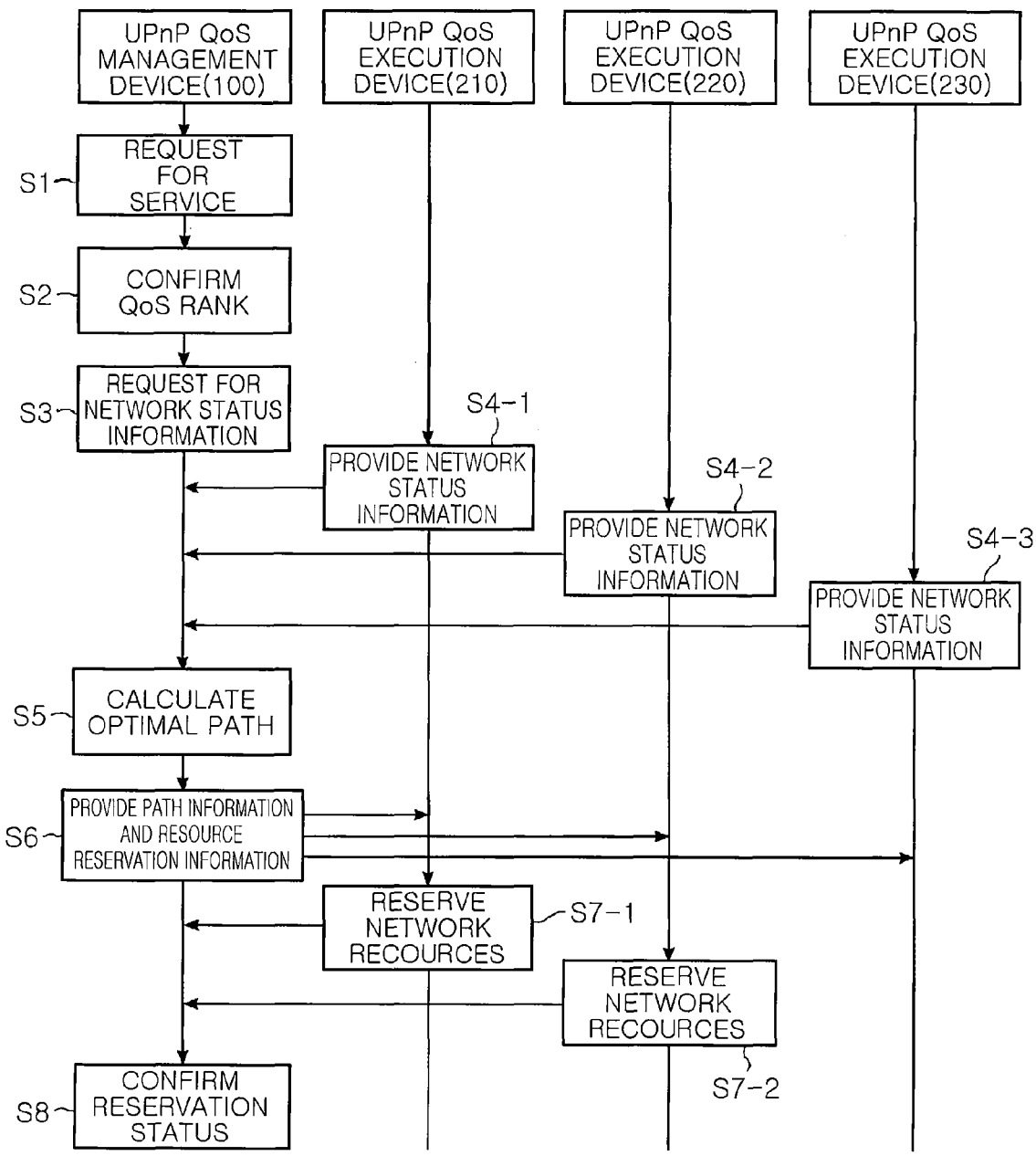
FIG. 3 is a diagram for illustrating a method of calculating a path of a UPnP QoS network system according to an embodiment of the present invention.

FIG. 3 is a diagram for illustrating a method of reserving a path and resources of a UPnP QoS network system according to an embodiment of the present invention.

First, when receiving a request for a service from a predetermined communication terminal (S1), the UPnP QoS management device 100 confirms the QoS rank of the requested service and acquires the traffic policy and the path calculation policy corresponding to the QoS rank (S2).

Then, the UPnP QoS management device 100 requests all the UPnP QoS execution devices 210, 220, and 230 located on the home network to provide network status information on neighboring nodes (S3).

All the UPnP QoS execution devices 210, 220, and 230 recognize interface connection status with each neighboring device and a traffic amount of each interface and generates and transmits the network status information to the UPnP QoS management device 100 (S4-1 to S4-3).

The UPnP QoS management device 100 acquires entire home network topology information and status information of each link by using the network status information and calculates an optimal path from a predetermined communication terminal to a target communication terminal in consideration of the acquired topology information, status information of each link, and the path calculation policy (S5).

The UPnP QoS management device 100 provides the calculated path information and the resource reservation information to all the UPnP QoS execution devices 210 and 220 located on the calculated path (S6).

The UPnP QoS execution devices 210 and 220 that receive the path information and the resource reservation information selects an interface by referring to the path information provided by the UPnP QoS management device 100 instead of the MAC address table managed by the bridge and reserves the network resources of the selected interface by referring to the resource reservation information (S7-1 and S7-2).

The UPnP QoS execution devices 210 and 220 report the resource reservation result. The UPnP QoS management device 100 confirms the report. When the reservation of the resources is successful, the requested service begins. When the reservation of the resources is not successful, a new path is calculated, or reservation of the network resources is requested again.

The UPnP QoS management device and the UPnP QoS execution device are embodied as an internal system of a switch device or bridge device for embodying the UPnP QoS network system or embodied as independent devices. In addition, the UPnP QoS management device and the UPnP QoS execution device are embodied in a single device or embodied as independent devices, if necessary.

In the closed type UPnP QoS network system and method, the UPnP QoS execution device reserves network resources based on the path information and resource reservation information provided by the UPnP QoS management device. Accordingly, since the path calculated by the UPnP QoS management device is the same as the path through which the UPnP QoS execution device reserves the network resources, it is possible to reserve suitable network resources and to provide stable QoS.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A UPnP QoS (universal plug and play quality of service) network system comprising:
    a plurality of UPnP QoS execution devices configured to collect and provide network status information, and perform QoS for a requested service by reserving network resources on a selected path in response to path information and resource reservation information, the selected path being one selected among a plurality of paths; and
    at least one UPnP QoS management device configured to determine a path to be selected for the requested service by considering a QoS rank for the requested service and the network status information provided by the plurality of UPnP QoS execution devices, and provide the path information and the resource reservation information to the plurality of UPnP QoS execution devices,
    wherein the plurality of UPnP QoS execution devices select the path determined by UPnP QoS management and reserve network resources on the selected path in response to path information and resource reservation information provided by the UPnP QoS management device,
    wherein the path information is address information of all UPnP QoS execution devices located on a path from the device requesting the service to be provided to a target device, address information of neighboring devices of the UPnP QoS execution devices, or identification information of interface devices of the UPnP QoS execution devices.

2. A UPnP QoS (universal plug and play quality of service) network system comprising:
    at least one UPnP QoS execution device configured to collect and provide network status information, and perform QoS for a requested service by reserving network resources on a selected path in response to path information and resource reservation information, the selected path being one selected among a plurality of paths; and
    at least one UPnP QoS management device configured to determine a path to be selected for the requested service by considering a QoS rank for the requested service and the network status information provided by the UPnP QoS execution device, and provide the path information and the resource reservation information to the UPnP QoS execution device,
    wherein the UPnP QoS execution device selects the path determined by UPnP QoS management and reserves network resources on the selected path in response to path information and resource reservation information provided by the UPnP QoS management device, and
    wherein the UPnP QoS management device includes:
        a network status information collector configured to collect the network status information through the UPnP QoS execution device;
        a path calculator configured to calculate an optimal path for the requested service by considering the QoS rank for the requested service and the network status information collected by the network status information collector and generate the path information, the optimal path being the selected path; and
        a path and resource reservation controller configured to generate the resource reservation information for the requested service based on the QoS rank and transmit the resource reservation information together with the path information to the UPnP QoS execution device.

3. The UPnP QoS network system of claim 2, wherein the UPnP QoS network system includes a plurality of UPnP QoS execution devices, and
    wherein the path and resource reservation controller provides the path information and the resource reservation information only to the UPnP QoS execution devices located on the calculated path.

4. The UPnP QoS network system of claim 2, wherein the UPnP QoS network system includes a plurality of UPnP QoS execution devices, each UPnP QoS execution device including:
    a network status information provider collecting and providing the network status information to the UPnP QoS management device in response to a request of the UPnP QoS management device; and
    a resource reservation unit selecting an interface based on the path information and reserving network resources of the selected interface based on the resource reservation information.

5. The UPnP QoS network system of claim 4, wherein the UPnP QoS execution device further includes an interface unit configured to transmit and receive data for providing the requested service through network resources reserved by the resource reservation unit.

6. The UPnP QoS network system of claim 2, wherein the network status information includes interface connection status between the UPnP QoS execution device and neighboring devices and information for reporting a traffic amount of each interface.

7. The UPnP QoS network system of claim 2, wherein the path information is address information of all the UPnP QoS execution devices located on a path from the device requesting the service to be provided to a target device, address information of neighboring devices of the UPnP QoS execution devices, or identification information of interface devices of the UPnP QoS execution devices.

8. The UPnP QoS network system of claim 2, wherein the resource reservation information includes connection information of the requested service traffic feature information.

9. A method of reserving a path and resources of UPnP QoS (universal plug and play quality of service) network system including a UPnP QoS management device and a plurality of UPnP QoS execution devices, the method comprising:
    collecting network status information of each UPnP QoS execution device by using the UPnP QoS management device if service is requested to be provided;
    acquiring path information and resource reservation information by using the UPnP QoS management device according to the network status information and a QoS rank of the service;
    determining a path to be selected based on the path information and selecting an interface on the path to be selected, the selected path being one selected among a plurality of paths; and
    reserving network resources of the selected interface based on the resource reservation information by using each UPnP QoS execution device,
    wherein the plurality of UPnP QoS execution devices select the path determined by UPnP QoS management and reserve network resources on the selected path in response to path information and resource reservation information provided by the UPnP QoS management device,
    wherein the path information is address information of all UPnP QoS execution devices on a path from the device requesting the service to be provided to a target device, address information of neighboring devices of the UPnP QoS execution devices, or identification information of interface devices of the UPnP QoS execution devices.

10. The method of claim 9, wherein the selecting of the interface comprises:
    requesting the plurality of UPnP QoS execution devices to provide the network status information by using the UPnP QoS management device if the service is requested to be provided; and
    collecting and providing the network status information to the UPnP QoS management device by using the plurality of UPnP QoS execution device.

11. The method of claim 9, wherein the network status information includes interface connection status between the plurality of UPnP QoS execution devices and neighboring devices and information for reporting a traffic amount of each interface.

12. A method of reserving a path and resources of UPnP QoS (universal plug and play quality of service) network system including one or more UPnP QoS management device and one or more UPnP QoS execution devices, the method comprising:
    collecting network status information of each UPnP QoS execution device by using the UPnP QoS management device if service is requested to be provided;
    acquiring path information and resource reservation information by using the UPnP QoS management device according to the network status information and a QoS rank of the service;
    determining a path to be selected based on the path information and selecting an interface on the path to be selected, the selected path being one selected among a plurality of paths; and
    reserving network resources of the selected interface based on the resource reservation information by using each UPnP QoS execution device,
    wherein the UPnP QoS execution device selects the path determined by UPnP QoS management and reserves network resources on the selected path in response to path information and resource reservation information provided by the UPnP QoS management device, and
    wherein the acquiring of the path information and the resource reservation information comprises:
        calculating an optimal path for the service by considering a QoS rank of the service and the network status information, the optimal path being the selected path;
        generating the resource reservation information for the requested service based on the QoS rank of the service; and
        providing the path information and the resource reservation information to all the UPnP QoS execution devices located on the calculated path.

13. The method of claim 12, wherein the path information is address information of all the UPnP QoS execution devices on a path from the device requesting the service to be provided to a target device, address information of neighboring devices of the UPnP QoS execution devices, or identification information of interface devices of the UPnP QoS execution devices.

14. The method of claim 12, wherein the resource reservation information includes connection information of the requested service traffic feature information.

* * * * *